United States Patent [19]
Ayre et al.

[11] 3,740,003
[45] June 19, 1973

[54] SECONDARY INJECTION/JET REACTION CONTROL

[75] Inventors: Vernon Hall Ayre; J. C. Dunaway, both of Falkville, Ala.

[73] Assignee: The United States of America as represented by the Secretary of the Army, Washington, D.C.

[22] Filed: Mar. 13, 1972

[21] Appl. No.: 234,091

[52] U.S. Cl............... 244/3.22, 60/229, 239/265.23
[51] Int. Cl. .......................... F41g 7/00, B64c 15/06
[58] Field of Search ................... 244/3.22; 60/228, 60/229, 230, 231, 232, 35.6 RS; 102/DIG. 3; 239/265.17, 265.19, 265.23

[56] References Cited
UNITED STATES PATENTS

| | | |
|---|---|---|
| 2,974,594 | 3/1961 | Boehm............................ 60/229 X |
| 3,190,069 | 6/1965 | Gorbaty........................... 60/229 X |
| 3,204,405 | 9/1965 | Warren et al....................... 60/231 |
| 3,285,262 | 11/1966 | Ernst et al. ...................... 60/229 X |
| 3,502,285 | 3/1970 | Gambill ............................ 244/3.22 |
| 3,606,165 | 9/1971 | Dunaway ....................... 239/265.17 |

Primary Examiner—Benjamin A. Borchelt
Assistant Examiner—James M. Hanley
Attorney—Harry M. Saragovitz, Edward J. Kelly, Herbert Berl et al.

[57] ABSTRACT

The present invention incorporates a missile control technique which combines secondary injection with jet reaction to control the flight path of the missile. The technique uses four double opposed jet units and bi-stable fluid amplifiers to selectively control the flow of fluid through the nozzles.

3 Claims, 3 Drawing Figures

PATENTED JUN 19 1973 3,740,003

SECONDARY INJECTION/JET REACTION CONTROL

BACKGROUND OF THE INVENTION

Previous inventions in this field are of two types. The first type incorporates a single bi-stable valve in each control channel. The output of the bi-stable valve is ducted to opposite sides of the exit of the nozzle. These ducts are necessarily long and cause friction losses in the fluid flow. The other system employs two bi-stable valves in each control channel. One output of each valve is directed normal to and into the exhaust gases exiting from the main rocket nozzle to deflect the same while the other output of each valve is directed parallel to the main thrust and it augments said thrust when a sideforce is not needed.

An object of this invention is to provide two bi-stable amplifier valves for each control channel. The valves are diametrically opposed with one output of each valve normal to and into the stream of exhaust gases and the other output normal to and away from the exhaust stream.

Another object of the invention is to provide a system whih is easier to package and exhibits less friction losses than the prior inventions of this type.

Another object of the invention is to provide a system which generates approximately twice as much sideforce as would be provided by secondary injection alone.

DETAILED DESCRIPTION OF THE INVENTION

Figure 1:
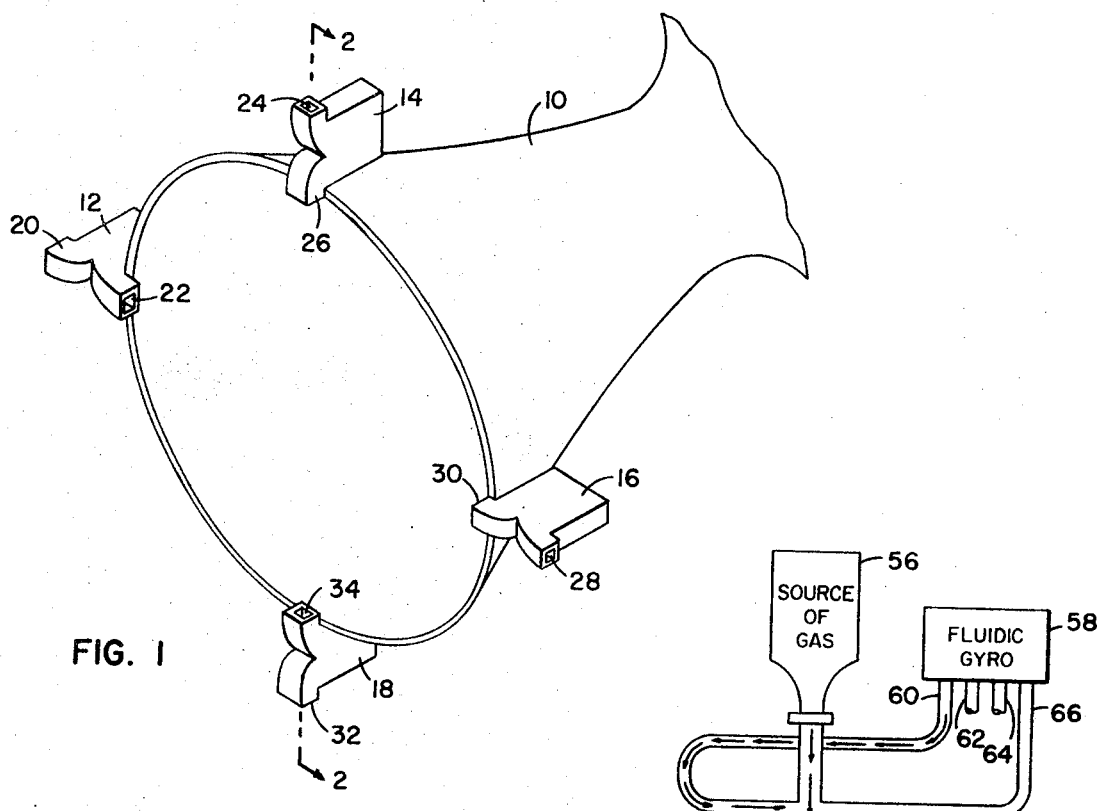
FIG. 1 of the drawing illustrates a rocket exhaust nozzle having mounted at 90° intervals about its periphery four bi-stable fluid amplifiers each of which has one nozzle directed normal to and toward the center of the main nozzle and the other being directed normal to and away from the center of the main nozzle.

Referring now to the drawings, 10 indicates the main nozzle of a missile. A series of four fluid amplifiers 12, 14, 16 and 18 are mounted at 90° intervals about the periphery thereof. Each of the fluid amplifiers is provided with two oppositely directed jet nozzles numbered 20–34 respectively.

Figure 2:
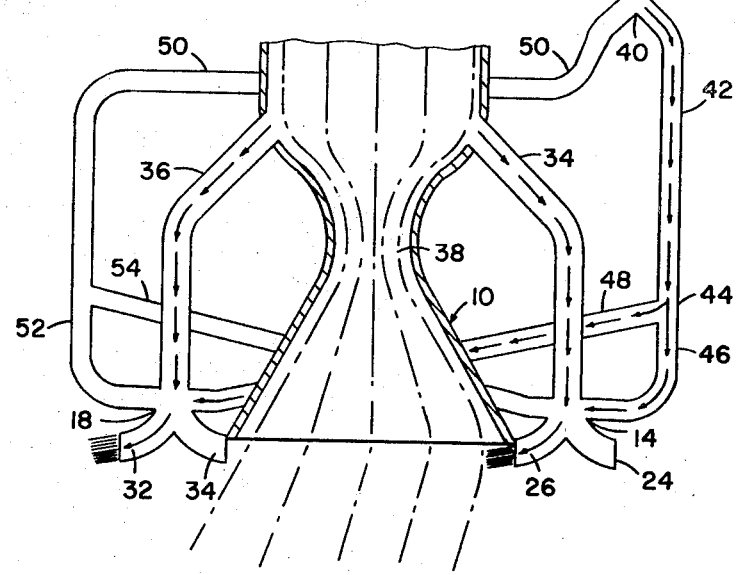
FIG. 2 is a diagrammatic illustration of one pair of diametrically opposed fluid amplifiers and the control circuits associated therewith and illustrates one condition of operation of said amplifiers.
Figure 3:
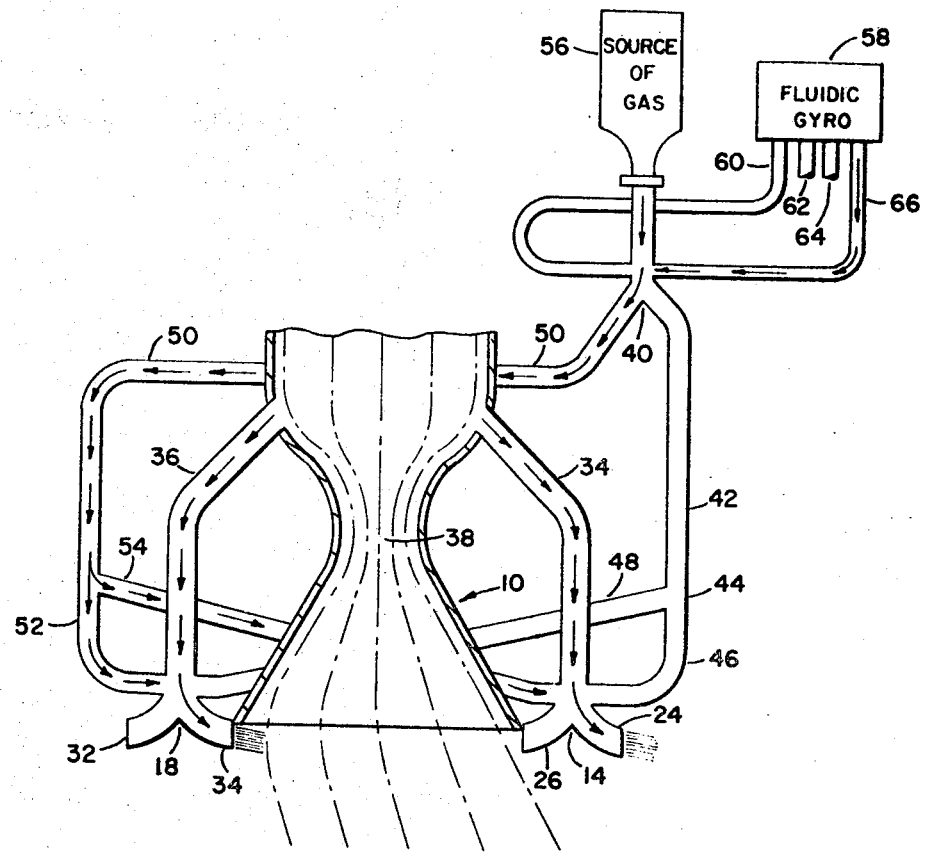
FIG. 3 is a diagrammatic illustration similar to FIG. 2 and illustrates the opposite mode of operation.

Referring now to FIGS. 2 and 3, two oppositely disposed fluid amplifiers 14 and 18 are schematically shown in section. Two ducts 34 and 36 respectively connect the fluid amplifiers 14 and 18 with the rocket motor chamber forward of the throat 38 thereof. The flow through the exhaust nozzles 24 and 26 of fluid amplifier 14 and through nozzles 32 and 34 of amplifier 18 is controlled by the output of a fifth bi-stable fluid amplifier 40. The output of fluid amplifier 40 is connected by a duct 42 which branches at 44 into two ducts 46 and 48 the duct 46 being connected to the control port on one side of ampffier 14 and the duct 48 being connected to one control port of the amplifier 18. The other output of amplifier 40 is connected by a duct 50 which branches into two ducts 52 and 54 the duct 52 being connected to the opposite control port of amplifier 18 and the duct 54 being connected to the opposite control port of the amplifier 14.

The input to amplifier 40 is connected to a source of high pressure gas which may be bottled gas or a gas generator system. This source of gas is indicated at 56. The control of amplifier 40 is effected by the output of a fluid gyro 58 which is provided with four output ports 60, 62, 64 and 66 respectively. The ports 62 and 64 are broken off since they control the other channel not illustrated. The port 60 is connected to the inlet control port on one side of the fluid amplifier 40 while the duct 66 is connected to the control port on the other side of fluid amplifier 40.

In the operation of the device, as the missile flies the fluid gyro in response to differentiations in the attitude of the missile will put out fluid in the ducts 60, 62, 64 and 66 respectively. When the missile deviates from its programmed flight path, the gyro will indicate such deviation by creating an imbalance in the output in the oppositely disposed conduits 60 and 66. In the illustration shown in FIG. 2 this imbalance is shown by a larger output being effected in conduit 60 than in conduit 66. When this greater output reaches the control port of the amplifier 40 it causes the high pressure gas from the gas source 56 to be deflected into the conduit 42 which splits at 44 into conduits 46 and 48. The fluid entering from the conduit 46 into the control port of the amplifier 14 casues the gases flowing through conduit 34 to be deflected into nozzle 26 to deflect by secondary injection the main exhaust stream gases. The fluid entering from conduit 48 into the control port of amplifier 18 causes the similar high pressure gases flowing through conduit 36 to be deflected into the exhaust nozzle 32 wherein they act as a jet reaction. The combined flow from the nozzles 26 and 32 thus effect movement of the rear end of the missile to the right as illustrated in FIG. 2.

Referring now to FIG. 3, the opposite condition is illustrated, wherein, the gases flowing from the fluid gyro are greater in conduit 66 than in conduit 60 thus deflecting the gas from the gas source 56 into the conduit 50 of the amplifier 40. The fluid in conduit 50 is split into conduits 52 and 54, the fluid from conduit 52 entering the control port of amplifier 18 causes the high pressure gas in conduit 36 to be deflected into the nozzle 34 to cause a secondary injection and deflect the main exhaust gas issuing from the nozzle 38, similiarly, the gases from conduit 54 entering the control port of the amplifier 14 causes the high pressure gases flowing through conduit 34 to be deflected into nozzle 24 to cause a jet reaction. The combined secondary injection from nozzle 34 and the jet reaction from nozzle 24 causes the rear end of the missile to move to the left as illustrated in FIG. 3.

The system could eliminate the fluid amplifier 40 by incorporating solenoid valves in conduits 42 and 50 which would be responsive to electrical signals generated by a conventional gyro in place of the fluidic gyro 58 illustrated.

It should be realized that similiar controls are used with respect to fluid amplifiers 12 and 16 but they have not been illustrated herein.

We claim:

1. A missile guidance control assembly comprising: four bistable fluid amplifiers spaced 90° apart about the periphery of the exit of the main exhaust nozzle of the missile;

each of said fluid amplifiers having two nozzles, one facing inwardly toward and normal to the axis of the main nozzle and the other 180° opposed thereto;

ducts tapping the main exhaust gases in front of the main nozzle and connected to the inlet port of said fluid amplifiers;

a source of high pressure gas connected to the control ports of each of said amplifiers;

a sensing device having four outputs;

means for selectively controlling flow of high pressure gas to said control ports of said amplifier in response to signals from said sensing device.

2. A missile guidance control assembly as set forth in claim 1, wherein, two additional bistable fluid amplifiers are provided each having its outputs connected to the opposite control ports of an opposed pair of the first mentioned fluid amplifiers;

the source of high pressure gas being connected to the inlet port of each of said additional two amplifiers; and means for controlling gas flow to the control ports of said two additional fluid amplifiers in response to signals from said sensing device.

3. A missile guidance control assembly as set forth in claim 2 wherein the sensing device is a fluidic gyro having four gas outputs;

an opposed pair of said gyro outputs being connected to the control ports of one of said additional amplifiers, and the other opposed pair of said gyro outputs being connected to the control ports of the other of said additional amplifiers.

\* \* \* \* \*